(12) United States Patent
Cui et al.

(10) Patent No.: US 10,855,917 B2
(45) Date of Patent: Dec. 1, 2020

(54) DATA PROCESSING METHOD AND DEVICE, CHIP, AND CAMERA

(71) Applicant: SZ DJI TECHNOLOGY CO., LTD., Shenzhen (CN)

(72) Inventors: Mingli Cui, Shenzhen (CN); Lei Zhu, Shenzhen (CN); Hao Cui, Shenzhen (CN); Wei Chen, Shenzhen (CN); Dong Qin, Shenzhen (CN); Chunlei Sun, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/383,043

(22) Filed: Apr. 12, 2019

(65) Prior Publication Data
US 2019/0238749 A1   Aug. 1, 2019

Related U.S. Application Data

(63) Continuation of application No. PCT/CN2016/101956, filed on Oct. 13, 2016.

(51) Int. Cl.
*H04N 5/232* (2006.01)
*H04N 19/48* (2014.01)
*H04N 19/93* (2014.01)

(52) U.S. Cl.
CPC ......... *H04N 5/23229* (2013.01); *H04N 19/48* (2014.11); *H04N 19/93* (2014.11)

(58) Field of Classification Search
CPC .... H04N 5/23229; H04N 19/93; H04N 19/48; H04N 5/232122; H04N 5/367
See application file for complete search history.

(56) References Cited

U.S. PATENT DOCUMENTS

| | | | | |
|---|---|---|---|---|
| 8,675,101 B1* | 3/2014 | Linzer | ................... | H04N 5/361 348/241 |
| 2006/0132857 A1 | 6/2006 | Akashi | | |
| 2008/0240584 A1* | 10/2008 | Saiga | ................... | H04N 19/46 382/232 |
| 2010/0073526 A1* | 3/2010 | Watanabe | ............. | H04N 5/367 348/247 |
| 2015/0195462 A1* | 7/2015 | Kano | .................... | H04N 5/367 386/328 |

FOREIGN PATENT DOCUMENTS

| | | |
|---|---|---|
| CN | 101277366 A | 10/2008 |
| CN | 101669142 A | 3/2010 |
| CN | 102640489 A | 8/2012 |

OTHER PUBLICATIONS

World Intellectual Property Organization (WIPO) International Search Report for PCT/CN2016/101956 dated May 31, 2017 5 Pages.

\* cited by examiner

*Primary Examiner* — Gevell V Selby
(74) *Attorney, Agent, or Firm* — Anova Law Group, PLLC

(57) ABSTRACT

A data processing method includes obtaining merged attribute information of an image sensor, obtaining pixel data of the image sensor, and processing the pixel data according to the merged attribute information. The merged attribute information includes elements each corresponding to at least one pixel of the image sensor and containing N types of attribute information of the at least one pixel. N is an integer larger than or equal to 2.

26 Claims, 9 Drawing Sheets

DATA PROCESSING METHOD AND DEVICE, CHIP, AND CAMERA

CROSS-REFERENCE TO RELATED APPLICATION

This application is a continuation application of International Application No. PCT/CN2016/101956, filed on Oct. 13, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to data processing and, more particularly, to a method, device, and chip for processing data, and a camera.

BACKGROUND

A camera includes an image sensor an image processing chip. The image sensor, also referred to as a photosensitive element, converts an optical image to an electronic signal, and includes a plurality of pixel points (or simply "pixels"). An image sensor having a higher resolution includes more pixels. The image processing chip can be, for example, a digital signal processing (DSP) chip.

After the image sensor acquires pixel data of an image and inputs the acquired pixel data to the image processing chip, the image processing chip synchronizes various types of attribute information of the image sensor with the pixel data to realize various functions. For example, the image processing chip may synchronize dead-pixel information of the image sensor with the pixel data to perform dead-pixel correction on the image. Alternatively, the image processing chip may synchronize phase-focus information of the image sensor with the pixel data, for controlling the camera to perform phase focus.

In conventional technologies, the various types of attribute information of the image sensor are separated from each other. For example, the dead-pixel information is located in a dead-pixel information table of the image sensor, and the phase-focus information is located in a phase-focus information table of the image sensor. These information tables are stored at different locations of the memory. Every time the image sensor acquires an image, the image processing chip needs to read a plurality of attribute information tables from different locations of the memory and synchronize the attribute information tables with the pixel data of the acquired image. The synchronization process is cumbersome, resulting in a low efficiency of the system data processing.

SUMMARY

In accordance with the disclosure, there is provided a data processing method including obtaining merged attribute information of an image sensor, obtaining pixel data of the image sensor, and processing the pixel data according to the merged attribute information. The merged attribute information includes elements each corresponding to at least one pixel of the image sensor and containing N types of attribute information of the at least one pixel. N is an integer larger than or equal to 2.

Also in accordance with the disclosure, there is provided a data processing method including obtaining N types of attribute information of pixels of an image sensor and generating merged attribute information of the image sensor according to the N types of attribute information. N is an integer larger than or equal to 2. The merged attribute information includes elements each corresponding to at least one pixel of the image sensor and containing the N types of attribute information of the at least one pixel.

Also in accordance with the disclosure, there is provided a chip including a memory storing a computer program and a processor configured to execute the computer program to obtain merged attribute information of an image sensor, obtain pixel data of the image sensor, and process the pixel data according to the merged attribute information. The merged attribute information includes elements each corresponding to at least one pixel of the image sensor and containing N types of attribute information of the at least one pixel. N is an integer larger than or equal to 2.

Also in accordance with the disclosure, there is provided a chip including a memory storing a computer program and a processor configured to execute the computer program to obtain N types of attribute information of pixels of an image sensor and generate merged attribute information of the image sensor according to the N types of attribute information. N is an integer larger than or equal to 2. The merged attribute information including elements each corresponding to at least one pixel of the image sensor and containing the N types of attribute information of the at least one pixel.

DETAILED DESCRIPTION OF THE EMBODIMENTS

Technical solutions of the present disclosure will be described with reference to the drawings. It will be appreciated that the described embodiments are part rather than all of the embodiments of the present disclosure. Other embodiments conceived by those having ordinary skills in the art on the basis of the described embodiments without inventive efforts should fall within the scope of the present disclosure.

Exemplary embodiments will be described with reference to the accompanying drawings, in which the same numbers refer to the same or similar elements unless otherwise specified.

As used herein, when a first assembly is referred to as "fixed to" a second assembly, it is intended that the first assembly may be directly attached to the second assembly or may be indirectly attached to the second assembly via another assembly. When a first assembly is referred to as "connecting" to a second assembly, it is intended that the first assembly may be directly connected to the second assembly or may be indirectly connected to the second assembly via a third assembly between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

Figure 1:
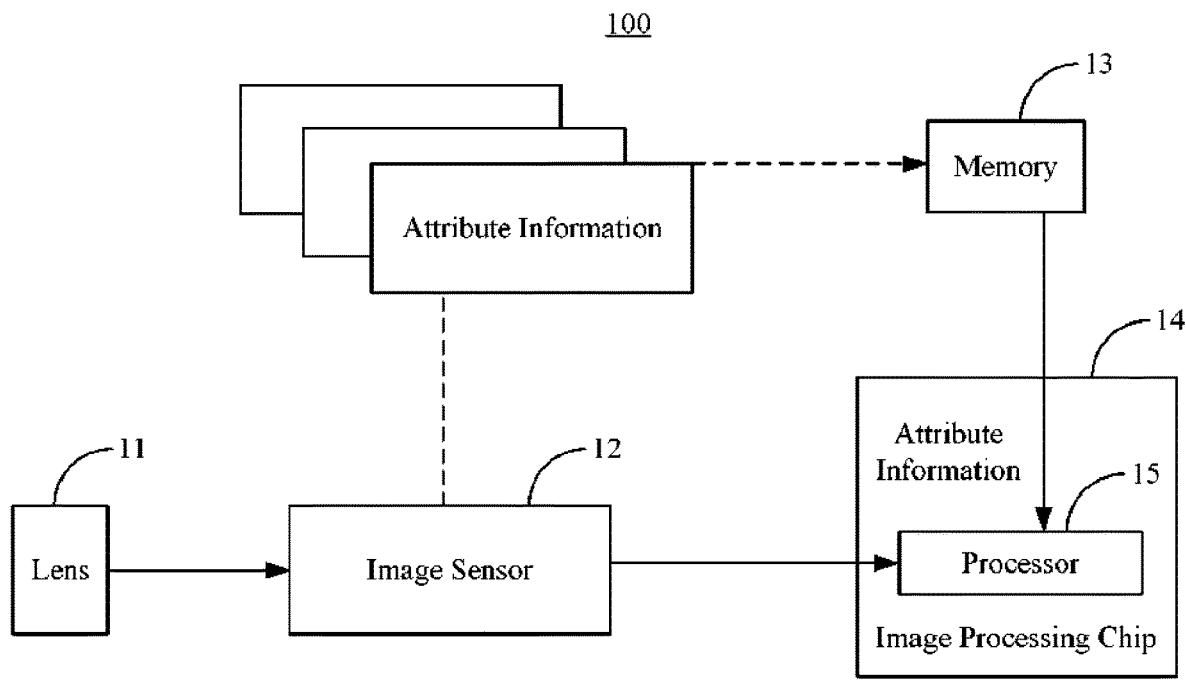
FIG. 1 is a schematic structural diagram of an exemplary camera.

FIG. 1 is a schematic structural diagram of an exemplary camera 100. As shown in FIG. 1, the camera 100 includes a lens 11, an image sensor 12, a memory 13, and an image processing chip 14. The camera can acquire pixel data through the lens 11 and the image sensor 12, and then input the acquired pixel data into the image processing chip 14 through the image sensor 12. The pixel data can be processed by a processor 15 in the image processing chip 14. The image processing chip 14 may be, for example, a digital signal processing (DSP) chip.

The image sensor 12 may have N (N being an integer and N≥2) types of attribute information, which are usually stored at different locations of the memory 13. The memory 13 may be a dynamic random access memory (DRAM). Each of the above N types of attribute information can be used for recording an attribute of a pixel of the image sensor 12. In some embodiments, the attribute information of the image sensor 12 can include tabular information, also referred to as attribute information tables. An attribute information table is usually consistent with a resolution of the image sensor 12, e.g., one element in the attribute information table can correspond to one pixel of the image sensor 12 for recording an attribute of the pixel. Common attribute information tables of the image sensor 12 include a dead-pixel information table and a phase-focus information table. The attribute information table is relatively large and thus may not be directly stored in an static random access memory (SRAM) of the image processing chip 14. Therefore, the image sensor attribute information is usually stored in the memory 13. When needed, the image processing chip 14 can read the image sensor attribute information from the memory 13.

In conventional technologies, various types of attribute information of the image sensor 12 are separated from each other, and synchronizations of different types of attribute information with the pixel data are also carried out separately. Therefore, every time the image sensor 12 inputs the pixel data, the inputted pixel data can only be synchronized with one type of attribute information. The following description takes the dead-pixel information table and the phase-focus information table as examples of the attribute information.

Generally, due to limitations of process and raw material, the image sensor 12 may have dead pixels that cannot function properly. Pixel data acquired by these dead pixels is inaccurate and needs to be corrected. In the conventional technologies, the dead pixels of the image sensor 12 are usually recorded in the dead-pixel information table. The dead-pixel information table is consistent with the resolution of the image sensor 12, e.g., one element in the dead-pixel information table corresponds to one pixel of the image sensor 12 and uses one bit to indicate whether the corresponding pixel point is a dead pixel. For example, a value "1" of an element in the dead-pixel information table indicates that the pixel corresponding to the element is a dead pixel. On the other hand, a value "0" of an element in the dead-pixel information table indicates that the pixel corresponding to the element is not a dead pixel. In the present disclosure, a pixel corresponding to an element is also referred to as a corresponding pixel of the element. Every time the image sensor 12 acquires an image, the image processing chip 14 reads the dead-pixel information table from the memory 13, and synchronizes the dead-pixel information with the pixel data of the acquired image.

Phase focus technology, also referred to as phase detection auto focus (PDAF) technology, can achieve fast focus. According to the phase focus technology, some phase-focus points, also referred to as "masked pixels," are arranged on the image sensor, which are used for phase detection. A focus offset (an offset value of focus) can be determined by distances between the phase-focus points and changes of the distances. As such, a more accurate focus can be achieved. In the conventional technologies, the phase-focus points of the image sensor 12 are recorded in the phase-focus information table. The phase-focus information table is consistent with the resolution of the image sensor 12, e.g., one element in the phase-focus information table corresponds to one pixel of the image sensor 12 and uses one bit to indicate whether the pixel point is a phase-focus point. For example, a value "1" of an element in the phase-focus information table indicates that the pixel corresponding to the element is a phase-focus point. On the other hand, a value "0" of an element in the phase-focus information table indicates that the pixel corresponding to the element is not a phase-focus point. Every time the image sensor 12 acquires an image, the image processing chip 14 reads the phase-focus information table from the memory 13, and synchronizes the phase-focus information table with the pixel data of the acquired image.

For a camera that supports dead-pixel processing and phase-focus processing, the image processing chip 14 reads the dead-pixel information table and the phase-focus information table, and synchronizes them with the pixel data acquired by the image sensor 12. However, because the dead-pixel information table and the phase-focus information table are separated from each other, the process for synchronizing the dead-pixel information table and the pixel data and the process for synchronizing the phase-focus information table and the pixel data are performed separately. Therefore, every time the image sensor inputs the pixel data, the pixel data can only be synchronized with one type of attribute information, resulting in a cumbersome synchronization process.

Figure 2:
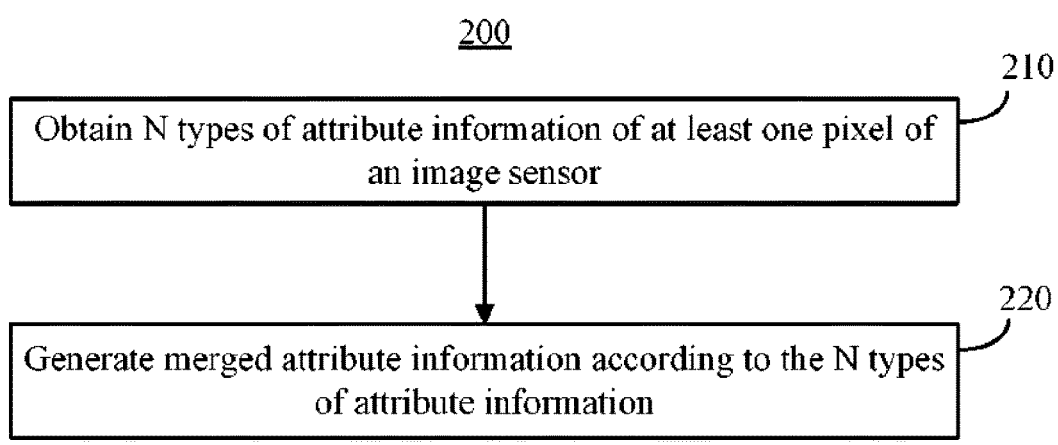
FIG. 2 is a schematic flow chart of a data processing method according to an exemplary embodiment.

FIG. 2 is a schematic flow chart of an exemplary data processing method 200 consistent with the disclosure. The method 200 can be implemented, e.g., in the image processing chip 14 shown in FIG. 1 or in a master chip (not shown in FIG. 1) of the camera.

As shown in FIG. 2, at 210, N types of attribute information of at least one pixel of an image sensor are obtained. N is an integer greater than or equal to two.

At 220, according to the N types of attribute information, merged attribute information is generated. The merged attribute information includes elements corresponding to pixels of the image sensor, respectively. An element of the merged attribute information that corresponds to at least one pixel of the image sensor includes the N types of attribute information of the at least one pixel, where N is an integer larger than or equal to 2.

For example, for a first pixel of the image sensor, the element in the merged attribute information that corresponds to the first pixel is referred to as a first element. The first element records the N types of attribute information of the first pixel. The N types of attribute information of the first pixel can be recorded in the first element according to an appropriate manner, which is not restricted in the present disclosure.

In some embodiments, the first element can record the N types of attribute information of the first pixel using N fields, also referred to as bit fields, respectively. Assuming N=2, the first element can include two fields: Field 1 and Field 2. Field 1 is configured to indicate whether the first pixel is a dead pixel, and Field 2 is configured to indicate whether the first pixel is a phase-focus point. For example, the first element can be 01, where the low-bit field is Field 1 and the value "1" in this field indicates that the first pixel is a dead pixel, and the high-bit field is Field 2 and the value "0" in this field indicates that the first pixel is not a phase-focus point. As described above, one field can be created for one of the N types of attribute information. This approach is relatively simple.

In some embodiments, the first element may include a target field and different values in the target field can be used to indicate different combinations of the N types of attribute information. A value in the target field is also referred to as a "target-field value." The target field can be part of the field occupied by the first element, or can be the entire field occupied by the first element.

When N=2, the target field can occupy 2 bits. For example, a value of 00 in the target field indicates that the first pixel is neither a dead pixel nor a phase-focus point. A value of 10 in the target field indicates that the first pixel is a phase-focus point but not a dead pixel. A value of 01 in the target field indicates that the first pixel is a dead pixel but not a phase-focus point. Generally, if the first pixel is both a dead pixel and a phase-focus point, the first pixel can be treated as a dead pixel during processing, and the value in the target field can still be 01. As such, some target-field values, such as 11, can be reserved for identifying other information. According to the present disclosure, there is no need to find the N types of attribute information in different fields. The N types of attribute information can be determined at once according to the value of the target field, and the data processing efficiency can be further improved.

As discussed above, at least one element of the merged attribute information can include the N types of attribute information of a pixel corresponding to the at least one element. In some embodiments, one element of the merged attribute information can include the N types of attribute information of a pixel corresponding to that element, as described below.

The merged attribute information can adopt various formats. For example, the merged attribute information can be in the form of a table or in the form of an array. For example, when the merged attribute information takes the table form, it can be referred to as a merged attribute information table. Assuming the resolution of the image sensor is p×q, the merged attribute information table can be a table having p rows and q columns. An element, also referred to as "table item" or "table element," in the merged attribute information table can correspond to one pixel of the image sensor. In the example described below, it is assumed that p=q=3 and an element of the merged attribute information table includes first attribute information and second attribute information of the pixel corresponding to that element. It is further assumed that the first attribute information indicates whether a pixel is a dead pixel and the second attribute information indicates whether a pixel is a phase-focus point. Table 1 shows an exemplary merged attribute information table.

TABLE 1

| Merged Attribute Information Table | | |
|---|---|---|
| 00 | 01 | 00 |
| 10 | 00 | 10 |
| 01 | 00 | 00 |

The element in the first row and the first column, i.e., at the crossing point of the first row and the first column, in Table 1, hereinafter referred to as "Element 1," can correspond to the pixel located in the first row and the first column of the image sensor, hereinafter referred to as "Pixel 1." In Table 1, one element occupies 2 bits. For example, the value of Element 1 is "00." The lower bit of Element 1 can be the first attribute information, indicating whether Pixel 1 is a dead pixel. Similarly, the higher bit of Element 1 can be the second attribute, indicating whether Pixel 1 is a phase-focus point.

As described above, the merged attribute information can be a merged attribute information table. Further, in some embodiments, the merged attribute information table can be formed by combining the tables for the N types of attribute information of the image sensor. In these embodiments, one element of the merged attribute information table can indicate N attributes of the pixel corresponding to the element. The N types of attribute information tables can include a plurality of information tables such as a dead-pixel information table, a phase-focus information table, and/or another attribute information table. The attribute information table can be any information table that is consistent with the pixel position distribution of the image sensor. In some embodiments, the attribute information table to be merged can be an information table that has the characteristics of a sparse matrix (e.g., having a large number of 0 elements in the attribute information table) and/or a discrete distribution characteristic.

In some embodiments, the method consistent with the disclosure may further include storing the merged attribute information of the image sensor in a memory or compressing the merged attribute information. If the compressed merged attribute information is small enough, the merged attribute information table (after being compressed) can be stored in the static random access memory (SRAM) of the image processing chip. The image processing chip can then process the pixel data inputted by the image sensor based on the merged attribute information.

Figure 3:
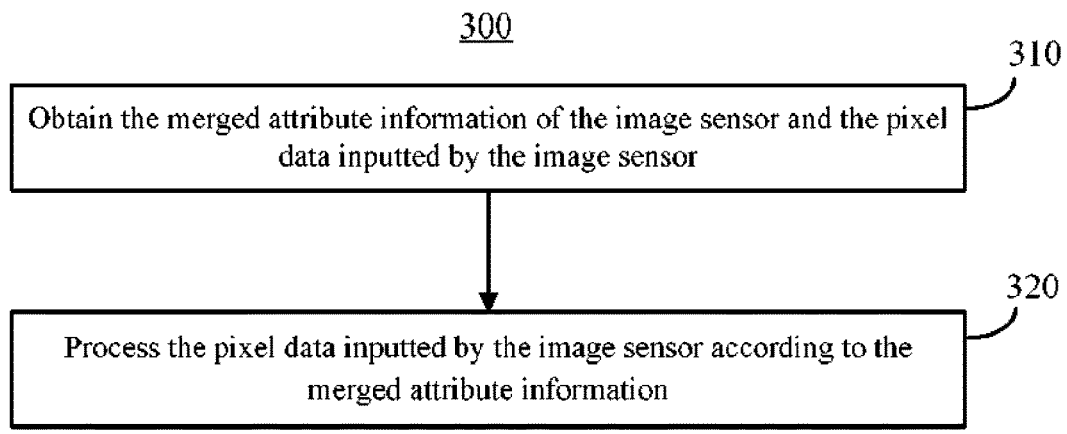
FIG. 3 is a schematic flow chart of a data processing method according to another exemplary embodiment.

FIG. 3 is a schematic flow chart of another exemplary data processing method 300 consistent with the disclosure. The method 300 can be implemented, for example, in the image processing chip 14 in FIG. 1.

As shown in FIG. 3, at 310, the merged attribute information of the image sensor and the pixel data inputted by the image sensor are obtained.

At 320, the pixel data inputted by the image sensor is processed according to the merged attribute information.

In some embodiments, processing the pixel data may include synchronizing the merged attribute information with the pixel data inputted by the image sensor. In some embodiments, after the image sensor acquires the pixel data, the pixel data is inputted to the image processing chip according to a clock cycle. For example, if the image sensor inputs the pixel data corresponding to four (4) pixels to the image processing chip in one clock cycle, the image processing chip may need to synchronize the elements in the merged attribute information table that correspond to the four pixels with pixel data corresponding to the four pixels to obtain information for a subsequent operation. For example, an elements in the merged attribute information table includes the first attribute information and the second attribute information of the pixel corresponding to the element, where the first attribute information indicates whether the corresponding pixel is a dead pixel and the second attribute information indicates whether the corresponding pixel is a phase-focus point. In this scenario, the image processing chip may need to synchronize the element in the merged attribute information table that corresponds to the four pixels with the pixel data of the four pixels within the one clock cycle, to determine whether the four pixels are dead pixels and/or phase-focus points to prepare for subsequent dead pixel processing and phase focus processing.

In the conventional technologies, various types of attribute information of the image sensor are separated from each other, and the processes of synchronizing the plurality of types of attribute information and the pixel data are also carried out separately. Therefore, every time the image sensor inputs pixel data, the inputted pixel data can only be synchronized with one type of attribute information. In contrast, according to the present disclosure, merged attribute information is used, in which an element corresponding to at least one pixel of the image sensor contains N types of attribute information of the at least one pixel. Thus, by using the merged attribute information, the image processing chip can complete the process of synchronizing the pixel data of the at least one pixel with the N types of attribute information of the at least one pixel at one time. As a result, the data processing efficiency is improved.

In some embodiments, the method 200 may further include compressing the merged attribute information to generate compressed data. Correspondingly, in some embodiments, obtaining the merged attribute information and the pixel data (310 in FIG. 3) may include obtaining the compressed data including the merged attribute information and decompressing the compressed data to recover the merged attribute information.

In the conventional technologies, the attribute information of the image sensor is generally stored in the form of an information table conforming to the resolution of the image sensor, and occupies a relatively large storage space. When processing the pixel data inputted by the image sensor, the image processing chip may need to repeatedly read the attribute information of the image sensor through a bus to synchronize with the pixel data. That is, every time an image is acquired, the attribute information of the image sensor may need to be read from the memory. Because the attribute information of the image sensor occupies a relatively large storage space, a relatively wide bus bandwidth may be needed when the attribute information is read into the image processing chip. However, the attribute information of the image sensor includes a large amount of redundant information. When the attribute information is compressed, a high compression ratio can be achieved. For example, the dead-pixel information table usually uses 0 and 1 to identify whether a pixel is a dead pixel, and the phase-focus information table also usually uses 0 and 1 to identify whether a pixel is a phase-focus point. Compared to the entire image, the percentage of the dead pixels and the percentage of the phase-focus points are small. As a result, most of the information in the dead-pixel information table and the phase-focus information table is redundant, i.e., most of the elements in the tables have a value of "0." That is, the dead-pixel information table and the phase-focus information table have the characteristics of sparse matrices, and thus can be well compressed.

Therefore, in some embodiments, the merged attribute information of the image sensor is not directly stored in the memory. In contrast, the compressed data containing the attribute information is stored in the memory. As such, the image processing chip does not need to repeatedly read the attribute information of the image sensor from the memory and the bandwidth requirement is also reduced. During the pixel data processing process, the image processing chip can read the compressed data from the memory, and then decompress the compressed data to restore the merged attribute information of the image sensor. This can effectively reduce the bandwidth required by the image processing chip to obtain the merged attribute information of the image sensor.

Figure 4:
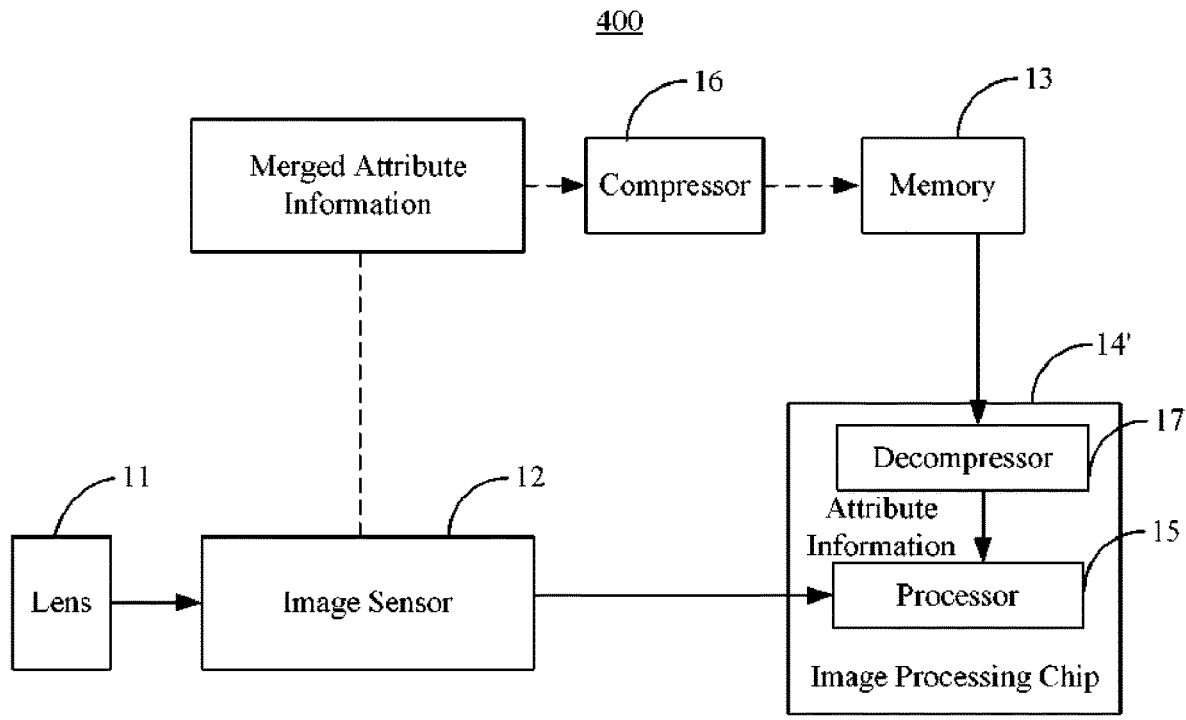
FIG. 4 is a schematic structural diagram of a camera according to an exemplary embodiment.

FIG. 4 is a schematic structural diagram of an exemplary camera 400 consistent with embodiments of the disclosure. The camera 400 includes the lens 11, the image sensor 12, the memory 13, an image processing chip 14', and a compressor 16. The image processing chip 14' includes the processor 15 and a decompressor 17. As shown in FIG. 4, before the merged attribute information is stored into the memory 13, the compressor 16 can compress the merged attribute information to obtain the compressed data. Correspondingly, after the image processing chip 14' reads the compressed data from the memory 13, the decompressor 17 can decompress the compressed data. The memory 13 and the image processing chip 14' are coupled to each other through a bus, and transferring the compressed data between the memory 13 and the image processing chip 14' requires less bus bandwidth as compared to, e.g., transferring uncompressed data. The compressor 16 may be a software compressor or a hardware compressor. Similarly, the decompressor 17 may be a software decompressor or a dedicated hardware decompressor. Using a hardware decompressor as the decompressor 17 can improve the decompression efficiency as compared to a software decompressor.

In the embodiments described above in connection with FIG. 4, the merged attribute information is compressed using the compressor 16 independent of the image processing chip 14'. In some other embodiments, the camera consistent with the disclosure can include an image processing chip that can compress the merged attribute information. For example, the image processing chip can include a compressor configured to compress data. In these embodiments, after the camera is powered up, the image processing chip can acquire the N types of attribute information of the image sensor, generate the merged attribute information based on the N types of attribute information, compress the merged attribute information to obtain the compressed data, and then store the compressed data into the memory.

In some other embodiments, the camera consistent with the disclosure can include a master chip in addition to the image processing chip. The master chip can be configured to generate and compress the merged attribute information. After obtaining the compressed data, the master chip can store the compressed data into the memory to be called by the image processing chip call.

Consistent with the disclosure, various compression methods can be used to compress the merged attribute information of the image sensor. For example, the merged attribute information can be compressed by the run-length coding (RLC) method. As another example, the merged attribute information can be compressed using the Huffman coding method. Hereinafter, description is made with run-length coding (including compressing using run-length encoding and decompressing using run-length decoding) being an exemplary coding method.

In some embodiments, compressing the merged attribute information to generate the compressed data can include compressing the merged attribute information by run-length encoding to obtain the compressed data. Correspondingly, decompressing the compressed data to recover the merged attribute information can include decompressing the compressed data by run-length decoding to recover the merged attribute information.

Data to be encoded by run-length coding is also referred to as "original symbol sequence." In the process of run-length encoding, the original symbol sequence can be processed in a certain order. A RUN field can be used to record the number of consecutive original symbols in the original symbol sequence that have a value of 0, and a Level Field can be used to record the original symbols in the original symbol sequence that have a nonzero value. As described above, the attribute information of the image sensor has a large number of 0 elements, and a relatively large compression ratio can be achieved when this type of information is compressed using run-length encoding. Therefore, in some embodiments, the attribute information of the image sensor can be merged and the merged attribute information can be compressed using run-length encoding. The compressed data can then be stored into the memory. In the pixel data processing process, the image processing chip can read the compressed data from the memory, and decode the compressed data to restore the merged attribute information of the image sensor. This can reduce bandwidth required by the image processing chip to read the merged attribute information of the image sensor.

In the present disclosure, the manner to select the original symbol sequence of the run-length coding is not limited.

In some embodiments, compressing the merged attribute information using run-length encoding to obtain and the compressed data can include performing run-length encoding in the unit of element of the merged attribute information table to obtain compressed data. That is, an original symbol in the original symbol sequence can include an element of the merged attribute information table. Correspondingly, decomposing the compressed data using run-length decoding to recover the merged attribute information can include decompressing the compressed data using run-length decoding to obtain the original symbol sequence. An original symbol of the original symbol sequence includes an element of the merged attribute information.

According to some embodiments of the disclosure as described above, run-length coding is performed directly in the unit of element in the merged attribute information, which is simple and can reduce the complexity of encoding/decoding.

In some embodiments, compressing the merged attribute information using run-length encoding to obtain the compressed data can include grouping the merged attribute information to obtain the original symbol sequence to be encoded, and then performing run-length encoding on the original symbol sequence to obtain the compressed data. In these embodiments, an original symbol of the original symbol sequence includes K elements of the merged attribute information, where K is an integer larger than 1. Correspondingly, decompressing the compressed data using run-length decoding to recover the merged attribute information can include decompressing the compressed data using run-length decoding to obtain the original symbol sequence. an original symbol of the original symbol sequence obtained by the decoding includes K elements of the merged attribute information. The K elements included in the original symbols of the original symbol sequence can be split to restore the merged attribute information.

As described above, the attribute information of the image sensor may include a large amount of redundant information, and the merged attribute information may also include a large amount of redundant information, Grouping K elements of the attribute information and using the groups of elements as the units (corresponding to the original symbols) in the run-length coding can improve the efficiency of run-length encoding/decoding.

The value of K is not limited in the present disclosure and can be determined by synthetically considering the coding efficiency and the decoding complexity of the decoder. For example, K may be equal to the number of pixels corresponding to the pixel data input by the image sensor to the image processing chip within one clock cycle. This can both ensure the smoothness of the synchronization process and reduce the decoding complexity of the decoder, which simplifies the decoder.

An example is described below in connection with Table 2. In this example, one element of the merged attribute information includes two bits, with one bit used to indicate whether the corresponding pixel is a dead pixel and the other bit used to indicate whether the corresponding pixel is a phase-focus point. Further, the image sensor inputs the pixel data of four pixels into the image processing chip in one clock cycle.

TABLE 2

Corresponding Relationship among K Value, Group Bit Width, and Maximum Codeword After Encoding

| K Value | Group Bit Width | Maximum Codeword after Encoding (Bit Width of Decoder) |
| --- | --- | --- |
| 1 | 2 | 22 |
| 2 | 4 | 24 |
| 4 | 8 | 28 |
| 8 | 16 | 36 |
| 16 | 32 | 52 |

During run-length encoding, the original symbol sequence is divided into a RUN sequence and a LEVEL sequence, where RUN refers to the number of consecutive original symbols that have a value of "0," and LEVEL refers to non-zero original symbols. The value of K (also referred to as "K value") equaling 1 indicates that one element of the merged attribute information is grouped into one group and the bit width of the group (also referred to as "group bit width") is 2. In this scenario, the encoder will perform run-length encoding in units of 2 bits and the amount of data that is processed each time is small. Similarly, the K value equaling 2 indicates that two elements of the merged attribute information are grouped into one group and the group bit width is 4. Increasing the K value, i.e., grouping more elements of the merged attribute information into one group as a basic unit for run-length coding, can improve the coding efficiency, but also increases the bit width required by the decoder of the image processing chip and increases the decoding complexity in one clock cycle. If the K value is too large and the decoder cannot complete the decoding in one clock cycle, the process of synchronizing the attribute information of the image sensor and the pixel data inputted by the image sensor may fail. For example, if the image sensor inputs pixel data of four pixels to the image processing chip in one clock cycle, in order to perform synchronization on the pixel data of the four pixels, the decoder needs to be able to decode the element of the merged attribute information that corresponds to the four pixels, which occupies 8 bits. Otherwise, the synchronization process mail fail, resulting in a system error.

As shown in Table 2, when K equals 1 or 2, the decoder can decode the element(s) corresponding to the one or two pixels in one clock cycle, and the synchronization process may not be performed smoothly. On the other hand, if K equals 16, the group bit width is 32 bits. In this scenario, the synchronization can be performed smoothly, but the maximum codeword after encoding is 52 This means that the decoder needs to handle 52 bits of data in one clock cycle, which may increase the complexity of the decoder. In some embodiments, the K value can be chosen to be 4 or 8. This not only ensures the smoothness of the synchronization process, but also reduces the complexity of the decoder.

In some embodiments, obtaining the merged attribute information and the pixel data (310 in FIG. 3) can include obtaining pixel data of M pixel(s) inputted by the image sensor in a first clock cycle, and obtaining the element(s) of the merged attribute information that correspond to the M pixel(s) before the first clock cycle, where M is an integer greater than or equal to one. In these embodiments, processing the pixel data inputted by the image sensor according to the merged attribute information (320 in FIG. 3) can include synchronizing the element(s) corresponding to the M pixel (s) with the pixel data of the M pixel(s).

In some embodiments, the element(s) of the merged attribute information that correspond to the M pixel(s) are obtained before the first clock cycle and stored in a buffer of the image processing chip. In the first clock cycle, the element(s) corresponding to the M pixel(s) are fetched from the buffer and synchronized with the pixel data of the M pixel(s).

In some other embodiments, obtaining the merged attribute information and the pixel data (310 in FIG. 3) can include obtaining pixel data of M pixel(s) inputted by the image sensor in a first clock cycle, and obtaining the element(s) of the merged attribute information that correspond to the M pixel(s) also in the first clock cycle, where M is an integer greater than or equal to one. In these embodiments, processing the pixel data inputted by the image sensor according to the merged attribute information (320 in FIG. 3) can include synchronizing the element(s) corresponding to the M pixel(s) with the pixel data of the M pixel(s).

In these embodiments, the acquisition of the element(s) corresponding to the M pixel(s) and the synchronization of the element(s) corresponding to the M pixel(s) with the pixel data of the M pixel(s) are completed in the same clock cycle. As such, there is no need to allocate a buffer space for the element(s) corresponding to the M pixel(s).

In some embodiments, synchronizing the element(s) corresponding to the M pixel(s) and the pixel data of the M pixel(s) can include determining the N types of attribute information of a first pixel among the M pixel(s) according to the element corresponding to the first pixel, and processing the pixel data of the first pixel according to the N types of attribute information of the first pixel.

In some embodiments, the first pixel can be any one of the M pixel(s). In the conventional technologies, the N types of attribute information of one pixel are distributed among N attribute information tables, and the synchronization processes of the N attribute information tables of the pixel and the pixel data of the pixel are carried out separately. As a result, the synchronization processes are cumbersome. In contrast, according to the present disclosure, the synchronization process of the N types of attribute information of one pixel and the pixel data of the pixel can be completed in one clock cycle. The synchronization process is simplified.

In some embodiments, the N types of attribute information includes first attribute information indicating whether the first pixel is a dead pixel and second attribute information indicating whether the first pixel is a phase-focus point. In these embodiments, processing the pixel data of the first pixel according to the N types of attribute information of the first pixel can include subjecting the pixel data of the first pixel to dead pixel processing when the first attribute information of the first pixel indicates that the first pixel is a dead pixel and the second attribute information indicates that the first pixel is a phase-focus point. In some embodiments, the pixel data of the first pixel is only subject to the dead pixel processing, e.g., without undergoing another processing.

According to the present disclosure, when a pixel is both a dead pixel and a phase-focus point, the pixel can be processed as a dead pixel. As such, inaccurate focusing can be avoided by not using that pixel for phase focusing.

Hereinafter, exemplary embodiments of the present disclosure will be described in more detail with reference to examples. The examples shown in FIGS. 5-8 are merely for the purpose of helping those skilled in the art to understand the embodiments of the disclosure and are not intended to limit the disclosure to the particular numerical or specific aspects illustrated. It will be apparent to those skilled in the art that various modifications or variations can be made by those skilled in the art in view of the examples shown in FIGS. 5-8, and such modifications and variations are within the scope of the disclosure.

Figure 5:
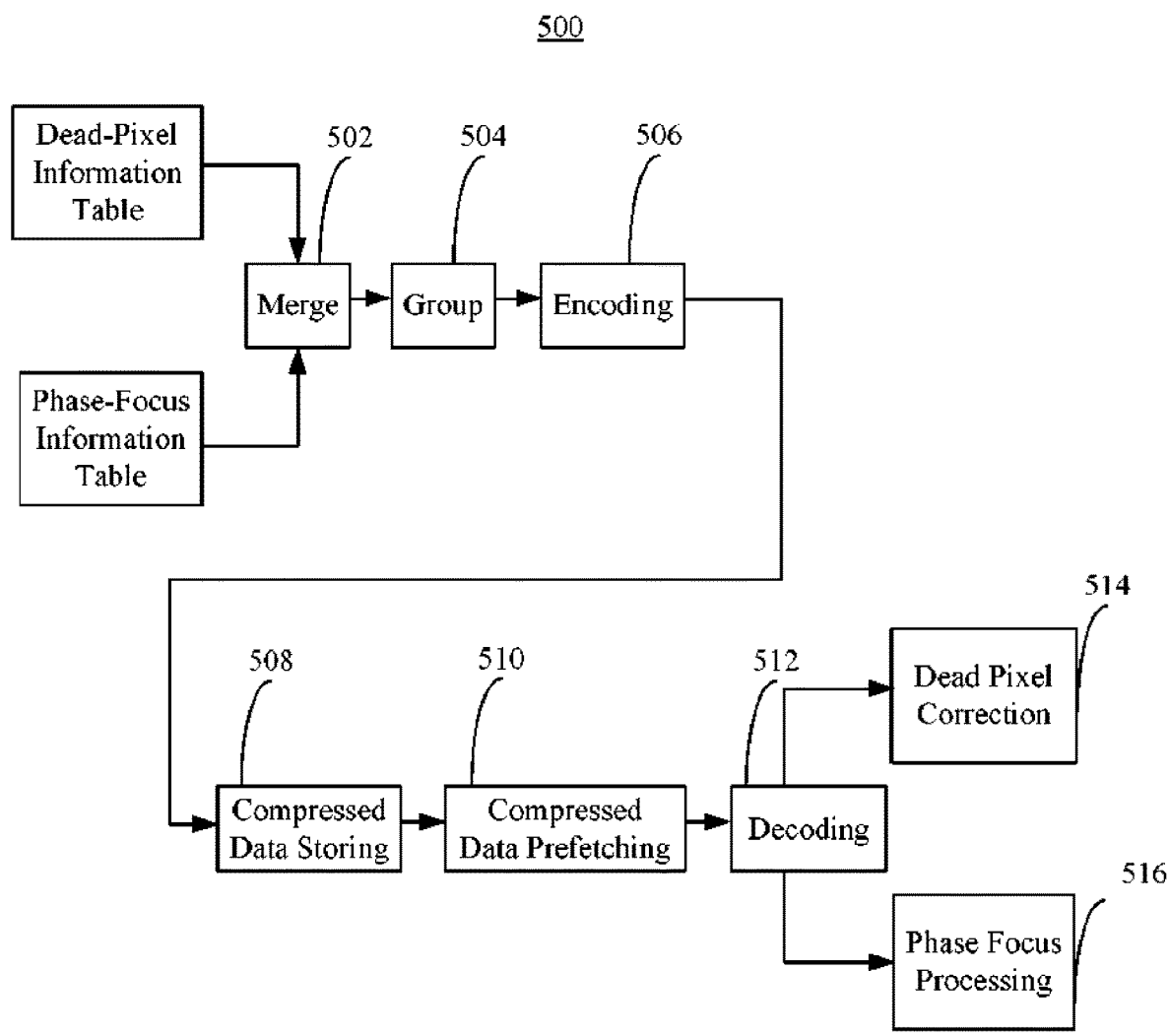
FIG. 5 is a schematic flow chart of a method for encoding-decoding attribute information of an image sensor according to an exemplary embodiment.

FIG. 5 is a schematic flow chart of a method 500 for encoding-decoding the attribute information of the image sensor consistent with embodiments of the disclosure. In the example shown in FIG. 5, the merged attribute information of the image sensor includes the merged attribute information table, which is obtained by merging the dead-pixel information table and the phase-focus information table of the image sensor.

As shown in FIG. 5, at 502, the dead-pixel information table and the phase-focus information table are merged to obtain the merged attribute information table.

The dead-pixel information table and the phase-focus information table are consistent with a resolution of the image sensor. That is, each of the dead-pixel information table and the phase-focus information table may include elements corresponding to pixels of the image sensor in a one-to-one correspondence. An element of the dead-pixel information table can indicate whether the pixel corresponding to the element is a dead pixel. For example, one element of the dead information table can occupy one bit, with a value of the bit of 0 indicating that the pixel corresponding to the element is not a dead pixel and a value of the bit of 1 indicating that the pixel corresponding to the element is a dead pixel. Similarly, an element of the phase-focus information table can indicate whether the pixel corresponding to the element is a phase-focus point. For example, one element of the phase-focus information table can occupy one bit, with a value of the bit of 0 indicating that the pixel corresponding to the element is not a phase-focus point and a value of the bit of 1 indicating that the pixel corresponding to the element is a phase-focus point.

Table 3 and Table 4 are exemplary dead-pixel information table and phase-focus information table, respectively.

TABLE 3

Dead-Pixel Information Table

| 0 | 1 | 0 |
| 0 | 0 | 0 |
| 1 | 0 | 0 |

TABLE 4

Phase-Focus Information Table

| 0 | 0 | 0 |
| 1 | 0 | 1 |
| 0 | 0 | 0 |

Table 5 is an exemplary merged attribute information table generated by merging Table 3 and Table 4.

TABLE 5

Merged Attribute Information Table

| 00 | 01 | 00 |
| 10 | 00 | 10 |
| 01 | 00 | 00 |

At 504, elements of the merged attribute information table are grouped to obtain an original symbol sequence to be subject to run-length encoding.

The elements of the merged attribute information table can be grouped in consideration of run-length encoding efficiency and decoding implementation complexity, as described above. Detailed description of the grouping process is omitted here.

At 506, run-length encoding is performed on the original symbol sequence.

Original symbol in the original symbol sequence is a basic unit for run-length encoding. For example, every four elements of the merged attribute information table can be grouped together to form one original symbol in the original symbol sequence. Because one element occupies 2 bits, one original symbol in the original symbol sequence occupies 8 bits. In this case, run-length encoding can be performed in units of 8 bits of data.

At 508, compressed data obtained by encoding is stored into the memory.

For example, the compressed data can be stored in a DRAM coupled to the image processing chip through an internal bus for use by the image processing chip when processing the pixel data. Run-length encoding is variable-length coding. For ease of addressing, a storage location of the compressed data can be recorded at the time of storing so that the image processing chip can read the compressed data based on the recorded storage location.

The processes 502-508 described above can be performed by the image processing chip, or can be performed by the master chip in the camera. In some embodiments, these processes can be performed by another computer through a software program, and then the obtained compressed data can be stored into the memory.

At 510, the image processing chip prefetches the compressed data from the memory.

For example, before the image sensor inputs the pixel data, the image processing chip can read the compressed data into a buffer of the image processing chip for subsequent decoding and synchronization processes. In some embodiments, the compressed data can be read in multiple times. That is, the image processing chip can read a portion of the compressed data from the memory at one time. After the decoding of this portion of the compressed data is complete, the image processing chip can read the remaining portion of the compressed data from the memory.

At 512, the compressed data is decoded to restore the merged attribute information table.

In some embodiments, the compressed data can be decoded using run-length decoding to recover the original symbols in the original symbol sequence. Because the elements of the merged attribute information table are grouped as described above at 504, one original symbol in the recovered original symbol sequence includes a group of elements of the attribute information table. For example, every four elements are grouped into one group. Thus, after an original symbol is obtained by decoding, the original symbol can be re-split into four elements to recover the merged attribute information table.

At 514, dead pixel correction is performed based on the merged attribute information table.

At 516, phase focus processing is performed based on the merged attribute information.

In some embodiments, the merged attribute information table can be further separated into the dead-pixel information table and the phase-focus information table, which can be separately synchronized with the pixel data inputted by the image sensor. In some other embodiments, the merged attribute information table can be directly synchronized with the pixel data inputted by the image sensor as a whole. No matter which synchronization method described above is used, after the pixel data inputted by the image sensor is acquired, all the synchronization processes of the pixel data can be completed at one time. This is different from the conventional technologies, in which the pixel data inputted by the image sensor can only be synchronized with one type of attribute information at one time.

Figure 6:
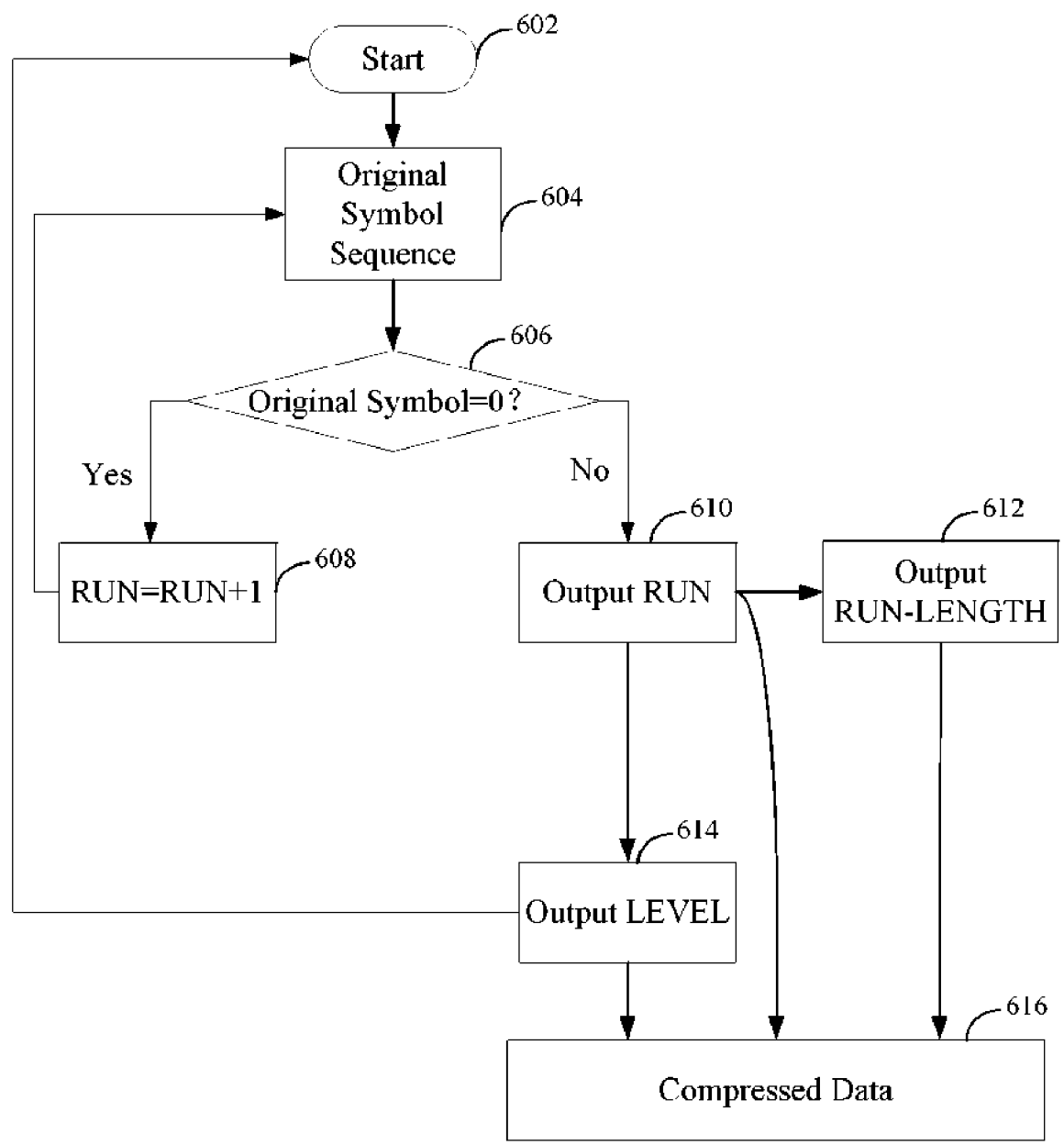
FIG. 6 is a detailed flow chart of the processor for encoding an original symbol sequence (506 in FIG. 5) according to an exemplary embodiment.

FIG. 6 is a flow chart showing details of the encoding process (506) in FIG. 5 consistent with embodiments of the disclosure.

In FIG. 6, 602 indicates the process starts.

At 604, the original symbols are retrieved from the original symbol sequence in order.

At 606-610, if a retrieved original symbol is 0, RUN is incremented; and if the original symbol is not 0 or RUN is equal to a preset maximum threshold, RUN stops counting and is outputted.

In some embodiments, an original symbol being 0 means that all bits in the original symbol have a value of 0. Otherwise, the original symbol is not 0 and is also referred to as a non-zero original symbol. For example, for an original symbol having 8 bits of data, if the 8 bits of data are all 0, RUN can be incremented by 1 data. The maximum threshold for RUN can be set in advance. For example, the RUN field can be set to not exceed 16 bits. Thus, the maximum threshold for RUN can be 65535.

At 612, a length of the RUN field (RUN-LENGTH) is outputted.

In run-length coding, the RUN field is not fixed because the value of RUN is not fixed. For the decoding side to correctly decode, a RUN-LENGTH field can be added before the RUN field to identify the length of the RUN field. For example, if the RUN field can occupy a maximum of 16 bits, 4 fixed bits can be assigned to the RUN length field. At the decoding side, the decoder can intercept the RUN length field, i.e., intercepting the 4 fixed bits, and determine the number of bits occupied by the RUN field based on the value of the RUN-LENGTH field. Based on the number of bits occupied by the RUN field, the decoder can truncates the RUN field and obtain the value of RUN from the RUN field.

At 614, LEVEL is outputted.

That is, after RUN is outputted, the original symbol immediately following RUN can be outputted as LEVEL. There are two possibilities. First, if the value of RUN is smaller than the preset maximum threshold, such as smaller than 65535, then outputted LEVEL is a non-zero original symbol. Second, if the value of RUN equals the maximum threshold, then outputted LEVEL can be an original symbol having a value of 0 or an original symbol having a non-zero value. After LEVEL is outputted, one codeword, which includes one RUN-LENGTH field, one RUN field, and one LEVEL field, can be obtained. The process returns to 602 to continue encoding until the entire original symbol sequence is processed.

At 616, the compressed data is generated.

In some embodiments, the codeword obtained at 614 is spliced to a tail of a previously obtained codeword to form the compressed data.

Figure 7:
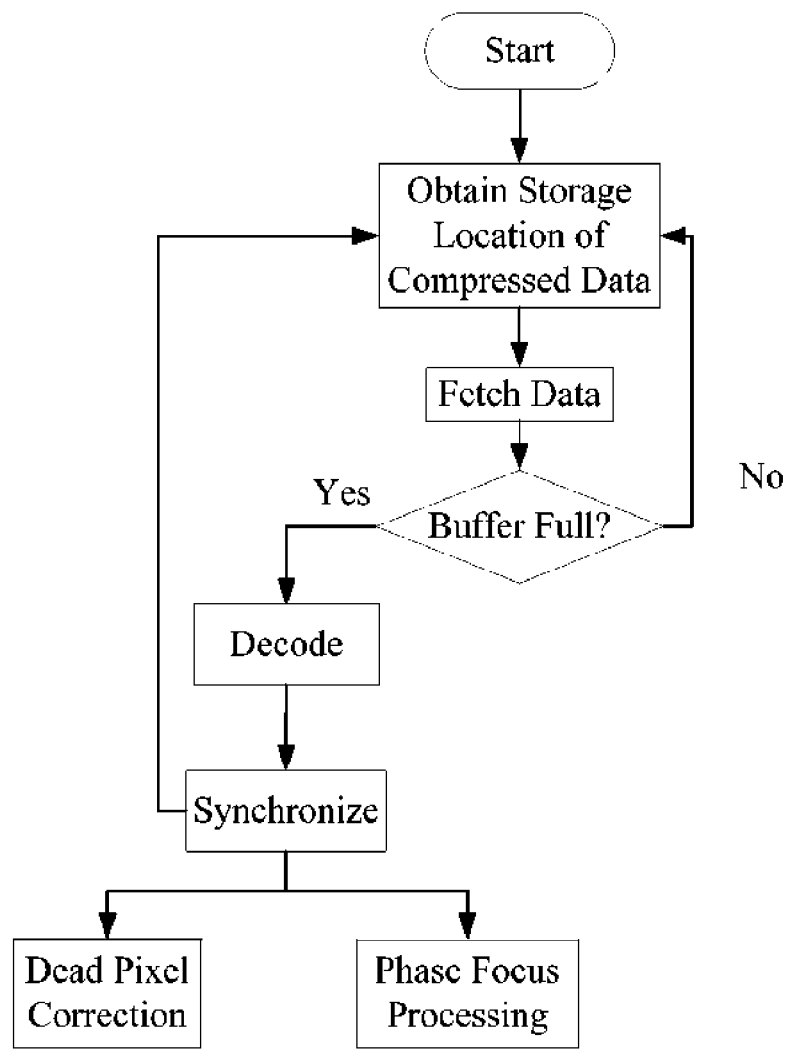
FIG. 7 is a detailed flow chart of processes 510-516 in FIG. 5 according to an exemplary embodiment.

FIG. 7 is a detailed flow chart of processes 510-516 in FIG. 5 consistent with embodiments of the disclosure. FIG. 7 shows a process of reading the compressed data. As shown in FIG. 7, compressed data storage location information is obtained, and then the compressed data is read. The compressed data can be read according to different schemes. For example, a fixed-size data stream can be read at a time. In some embodiments, as shown in FIG. 7, the size of the data stream read every time can be determined based on the storage situation in the buffer of the image processing chip.

Figure 8:
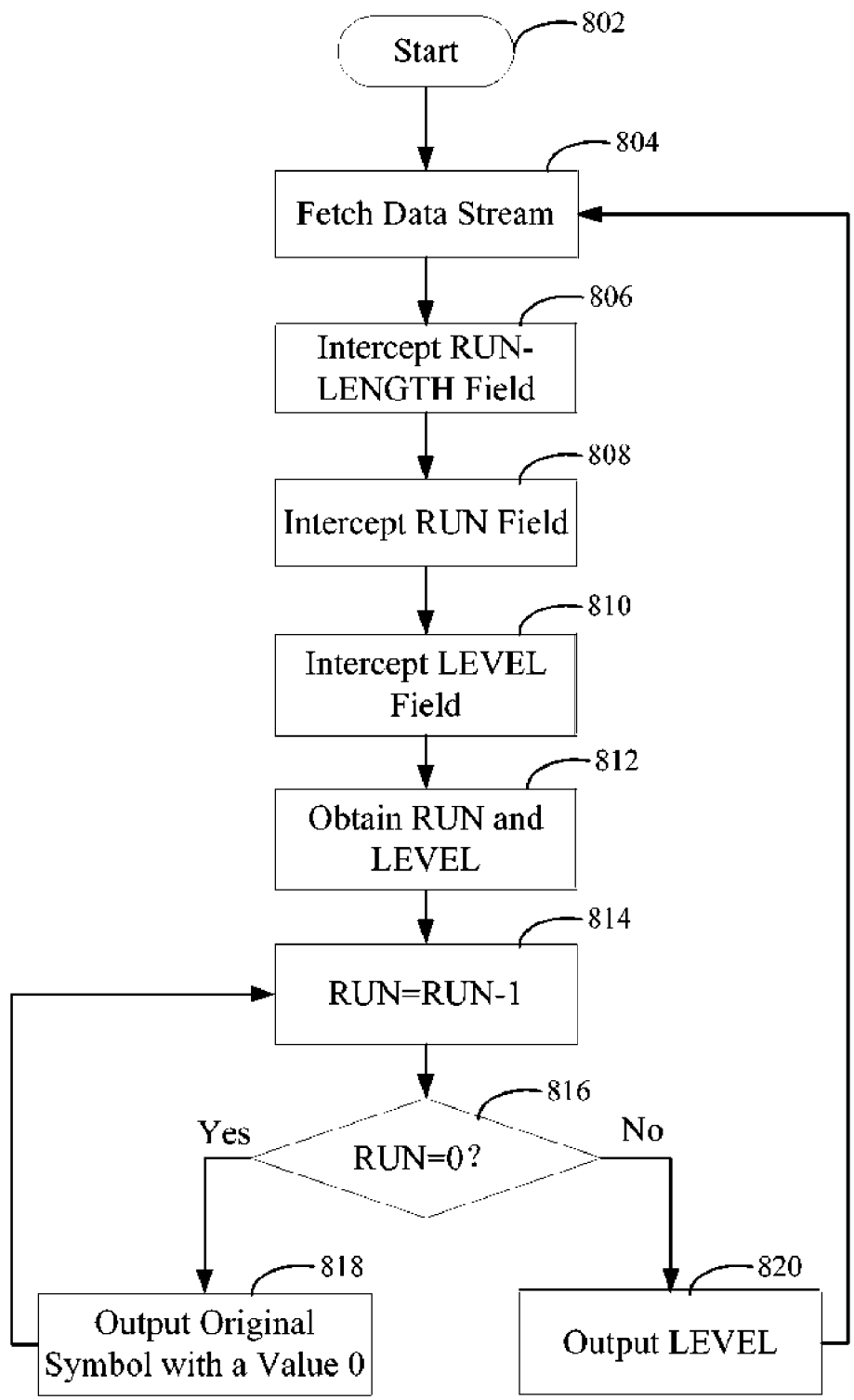
FIG. 8 is a detailed flow chart of the process for decoding compressed data (512 in FIG. 5) according to an exemplary embodiment

FIG. 8 is a detailed flow chart of process 512 in FIG. 5 consistent with embodiment of the disclosure. The process of FIG. 8 can be performed by the image processing chip. In some embodiments, the process shown in FIG. 8 can be executed by a decoder of the image processing chip. The decoder can be a dedicated hardware decoder, which can improve the decoding efficiency.

In FIG. 8, 802 indicates the process starts.

At 804, a data stream is fetched.

At 806, the RUN-LENGTH field is intercepted.

At 808, the RUN field is intercepted.

In run-length coding, the RUN field is not fixed because the value of RUN is not fixed. For the decoding side to correctly decode, the encoding side can add the RUN-LENGTH field before the RUN field to identify the length of the RUN field. For example, if the RUN field can occupy a maximum of 16 bits, 4 fixed bits can be assigned to the RUN length field. At the decoding side, the decoder can intercept the RUN length field, i.e., intercepting the 4 fixed bits, and determine the number of bits occupied by the RUN field based on the value of the RUN-LENGTH field. Based on the number of bits occupied by the RUN field, the decoder can truncates the RUN field and obtain the value of RUN from the RUN field.

At 810, the LEVEL field is intercepted.

The number of bits occupied by the LEVEL field is fixed, which is equal to the number of bits occupied by an original symbol in the original symbol sequence. For example, if one element of the merged attribute table occupies 2 bits and four elements are grouped together as one original symbol, then the original symbol occupies 8 bits and correspondingly the LEVEL field also occupies 8 bits. Directly intercepting the 8-bit data after the RUN field gives the LEVEL field.

At 812, RUN is obtained from the RUN field, and LEVEL is obtained from the LEVEL field.

At 814-820, the original symbol sequence is restored according to RUN and LEVEL.

RUN records the number of consecutive original symbols having a value of 0 before LEVEL. To restore the original symbol sequence, processes 814-820 are repeated to decrement the value of RUN until RUN is equal to zero. During an iteration, if RUN is not equal to 0, an original symbol with a value 0 is output. In contrast, if RUN is equal to 0, then LEVEL is output. After the loop is completed, the process returns to 804 to continue processing subsequent data until all data is processed.

Exemplary methods consistent with the disclosure are described above in detail with reference to FIGS. 1-8. Exemplary devices consistent with the disclosure will be described in detail below with reference to FIGS. 9-13. An exemplary device consistent with the disclosure can be configured to perform a method consistent with the disclosure, such as one of the exemplary methods described above. Therefore, reference can be made to the above-described exemplary methods for detailed operations of the exemplary devices described below.

Figure 9:
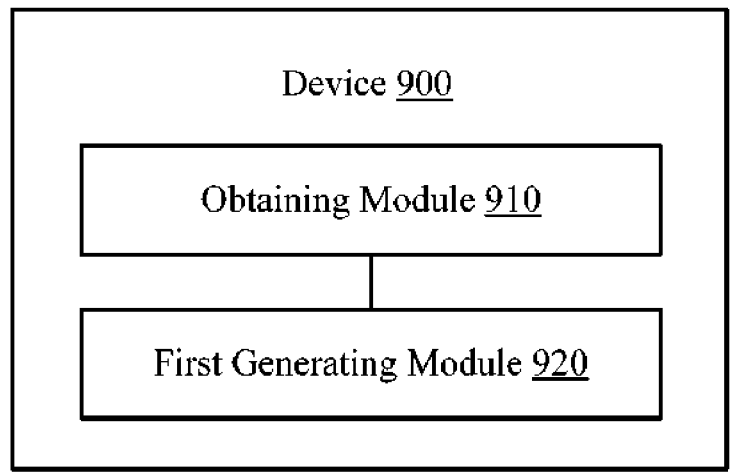
FIG. 9 is a schematic structural diagram of a data processing device according to an exemplary embodiment.

FIG. 9 is a schematic structural diagram of an exemplary data processing device 900 consistent with embodiments of the disclosure. The device 900 is configured to perform a method consistent with the disclosure, such as the exemplary method 200 described above in connection with FIG. 2. As shown in FIG. 9, the device 900 includes an obtaining module 910 and a first generating module 920.

The obtaining module 910 is configured to obtain N types of attribute information of at least one pixel of an image sensor. N is an integer greater than or equal to 2.

The first generating module 920 is configured to generate merged attribute information of the image sensor based on the N types of attribute information. The merged attribute information includes elements corresponding to pixels of the image sensor, respectively. An element of the merged attribute information that corresponds to at least one pixel of the image sensor includes the N types of attribute information of the at least one pixel.

According to the present disclosure, merged attribute information is used, in which an element corresponding to at least one pixel of the image sensor contains N types of attribute information of the at least one pixel. Thus, by using the merged attribute information, the image processing chip can complete the process of synchronizing the pixel data of the at least one pixel with the N types of attribute information of the at least one pixel at one time. As a result, the data processing efficiency is improved.

In some embodiments, the device 900 can further include a second generating module configured to compress the merged attribute information to generate compressed data.

In some embodiments, the second generating module is configured to compress the merged attribute information using run-length encoding to obtain the compressed data.

In some embodiments, the second generating module is configured to group the merged attribute information to obtain an original symbol sequence to be encoded. One original symbol in the original symbol sequence includes K elements of the merged attribute information. K is an integer greater than one. The second generating module is further configured to perform run-length encoding on the original symbol sequence to obtain the compressed data.

In some embodiments, K is greater than or equal to the number of pixels corresponding to the pixel data inputted to the image processing chip by the image sensor in a clock cycle.

In some embodiments, the first generating module is configured to determine, based on the N attributes of a first pixel of the image sensor, values of N fields in the merged attribute information that correspond to the first pixel. One of the N fields includes at least one bit, and the N fields are used to record the N types of attribute information of the first pixel, respectively.

In some embodiments, the first generating module can be configured to determine, based on the N attributes of the first pixel of the image sensor, a value of a target field in the merged attribute information that corresponds to the first pixel. The target field can have one of a plurality of values, and different values of the target field correspond to different combinations of the N types of attribute information.

In some embodiments, the device 900 can further include an access unit configured to store data containing the merged attribute information into a memory, so that the image processing chip can obtain the merged attribute information from the memory and process the pixel data inputted by the image sensor based on the merged attribute information.

In some embodiments, the merged attribute information includes tabular information or array information.

In some embodiments, the N types of attribute information of a pixel of the image sensor includes first attribute information and second information. The first attribute information indicates whether the pixel is a dead pixel, and the second attribute information indicates whether the pixel is a phase-focus point.

In some embodiments, the first attribute information includes a dead-pixel information table of the image sensor, and the second attribute information includes a phase-focus point information table of the image sensor.

Figure 10:
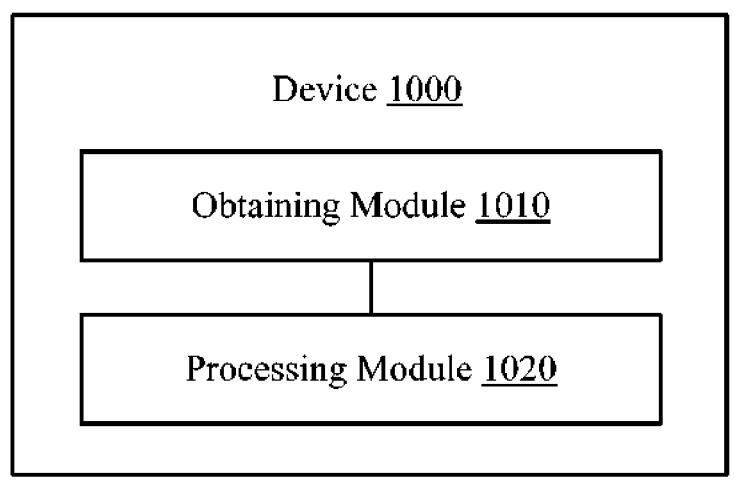
FIG. 10 is a schematic structural diagram of a data processing device according to another exemplary embodiment.

FIG. 10 is a is a schematic structural diagram of another exemplary data processing device 1000 consistent with embodiments of the disclosure. The device 1000 is configured to perform a method consistent with the disclosure, such as the exemplary method 300 described above in connection with FIG. 3. As shown in FIG. 10, the device 1000 includes an obtaining module 1010 and a processing module 1020.

The obtaining module 1010 is configured to obtain the merged attribute information of the image sensor and the pixel data inputted by the image sensor. The merged attribute information includes elements corresponding to pixels of the image sensor, respectively. An element of the merged attribute information that corresponds to at least one pixel of the image sensor includes the N types of attribute information of the at least one pixel, where N is an integer greater than or equal to 2.

The processing module 1020 is configured to process the pixel data inputted by the image sensor based on the merged attribute information.

According to the present disclosure, merged attribute information is used, in which an element corresponding to at least one pixel of the image sensor contains N types of attribute information of the at least one pixel. Thus, by using the merged attribute information, the image processing chip can complete the process of synchronizing the pixel data of the at least one pixel with the N types of attribute information of the at least one pixel at one time. As a result, the data processing efficiency is improved.

In some embodiments, the obtaining module 1010 is further configured to obtain compressed data including the merged attribute information and decompress the compressed data to recover the merged attribute information.

In some embodiments, the compressed data is obtained through compression using run-length encoding. Correspondingly, the obtaining module 1010 decompresses the compressed data using run-length decoding to recover the merged attribute information.

In some embodiments, the obtaining module 1010 is further configured to decompress the compressed data using run-length decoding to obtain the original symbol sequence (which was encoded using run-length encoding to obtain the compressed data) One original symbol in the original symbol sequence includes K elements of the merged attribute information. K is an integer greater than one. The obtaining module 1010 splits the K elements included in the original symbols of the original symbol sequence to restore the merged attribute information.

In some embodiments, K is greater than or equal to the number of pixels corresponding to the pixel data inputted to the image processing chip by the image sensor in a clock cycle.

In some embodiments, the obtaining module 1010 is further configured to obtain pixel data of M pixel(s) inputted by the image sensor in a first clock cycle, and obtain the element(s) of the merged attribute information that correspond to the M pixel(s) before or during the first clock cycle, where M is an integer greater than or equal to one. Correspondingly, the processing module 1020 is further configured to synchronize the element(s) of the merged attribute information that correspond to the M pixel(s) with the pixel data of the M pixel(s).

In some embodiments, the processing module 1020 is further configured to determine the N types of attribute information of a first pixel among the M pixel(s) according to the element corresponding to the first pixel, and process the pixel data of the first pixel according to the N types of attribute information of the first pixel.

In some embodiments, the processing module 1020 is further configured to obtain the N types of attribute information for the first pixel from N fields of the element corresponding to the first pixel. One of the N fields includes at least one bit, and the N fields are used to record the N types of attribute information of the first pixel, respectively.

In some embodiments, the processing module 1020 is further configured to determine the N types of attribute information of the first pixel according to the value of a target field of the element corresponding to the first pixel. Different values of the target field correspond to different combinations of the N types of attribute information.

In some embodiments, the N types of attribute information of the first pixel includes first attribute information and second information. The first attribute information indicates whether the first pixel is a dead pixel, and the second attribute information indicates whether the first pixel is a phase-focus point. The processing module 1020 is further configured to perform dead pixel processing on the pixel data of the first pixel when the first attribute information of the first pixel indicates that the first pixel is a dead pixel and the second attribute information indicates that the first pixel is a phase-focus point. In some embodiments, the processing module 1020 only performs the dead pixel processing on the pixel data of the first pixel, e.g., without performing another processing on the pixel data of the first pixel.

In some embodiments, the merged attribute information includes tabular information or array information.

In some embodiments, an element of the merged attribute information indicates the N types of attribute information of the pixel corresponding to the element.

In some embodiments, the N types of attribute information of a pixel includes first attribute information and second information. The first attribute information indicates whether the pixel is a dead pixel, and the second attribute information indicates whether the pixel is a phase-focus point.

Figure 11:
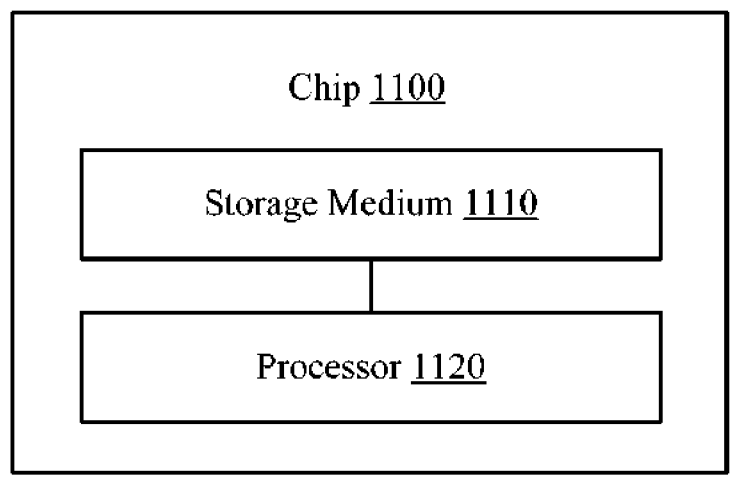
FIG. 11 is a schematic structural diagram of a chip according to an exemplary embodiment.

FIG. 11 is a schematic structural diagram of an exemplary chip 1100 consistent with embodiments of the disclosure. The chip 1100 is configured to perform a method consistent with the disclosure, such as the exemplary method 200 described above in connection with FIG. 2. As shown in FIG. 11, the chip 1100 includes a storage medium 1110 storing a computer program and a processor 1120 configured to execute the computer program to perform a method consistent with the disclosure, such as the exemplary method 200 described above in connection with FIG. 2.

In some embodiments, the processor 1120 executes the computer program to obtain N types of attribute information of at least one pixel of an image sensor (N is an integer greater than or equal to 2), and generate merged attribute information of the image sensor based on the N types of attribute information. The merged attribute information includes elements corresponding to pixels of the image sensor, respectively. An element of the merged attribute information that corresponds to at least one pixel of the image sensor includes the N types of attribute information of the at least one pixel.

According to the present disclosure, merged attribute information is used, in which an element corresponding to at least one pixel of the image sensor contains N types of attribute information of the at least one pixel. Thus, by using the merged attribute information, the image processing chip can complete the process of synchronizing the pixel data of the at least one pixel with the N types of attribute information of the at least one pixel at one time. As a result, the data processing efficiency is improved.

In some embodiments, the processor 1120 is further configured to compress the merged attribute information to generate compressed data.

In some embodiments, the processor 1120 is further configured to compress the merged attribute information using run-length encoding to obtain the compressed data.

In some embodiments, the processor 1120 is further configured to group the merged attribute information to obtain an original symbol sequence to be encoded. One original symbol in the original symbol sequence includes K elements of the merged attribute information. K is an integer greater than one. The processor 1120 is further configured to perform run-length encoding on the original symbol sequence to obtain the compressed data.

In some embodiments, K is greater than or equal to the number of pixels corresponding to the pixel data inputted to the image processing chip by the image sensor in a clock cycle.

In some embodiments, the processor 1120 is further configured to determine, based on the N attributes of a first pixel of the image sensor, values of N fields in the merged attribute information that correspond to the first pixel. One of the N fields includes at least one bit, and the N fields are used to record the N types of attribute information of the first pixel, respectively.

In some embodiments, the processor 1120 is further configured to determine, based on the N attributes of the first pixel of the image sensor, a value of a target field in the merged attribute information that corresponds to the first pixel. The target field can have one of a plurality of values, and different values of the target field correspond to different combinations of the N types of attribute information.

In some embodiments, the processor 1120 is further configured to store data containing the merged attribute information into a memory, so that the image processing chip can obtain the merged attribute information from the memory and process the pixel data inputted by the image sensor based on the merged attribute information.

In some embodiments, the merged attribute information includes tabular information or array information.

In some embodiments, the N types of attribute information of a pixel of the image sensor includes first attribute information and second information. The first attribute information indicates whether the pixel is a dead pixel, and the second attribute information indicates whether the pixel is a phase-focus point.

In some embodiments, the first attribute information includes a dead-pixel information table of the image sensor, and the second attribute information includes a phase-focus point information table of the image sensor.

Figure 12:
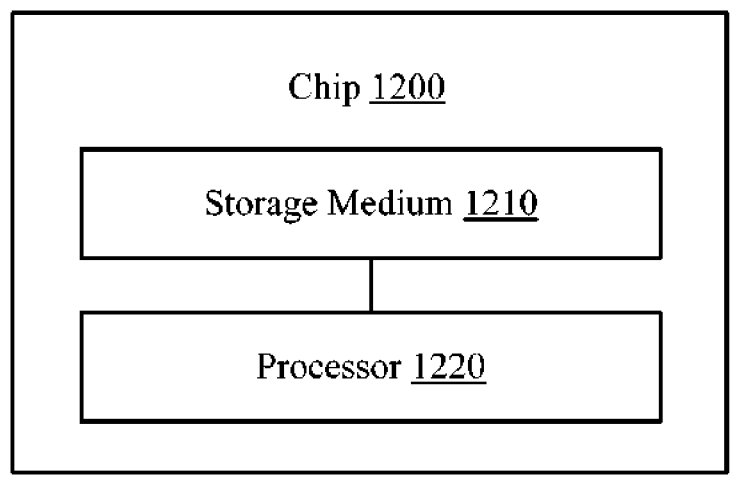
FIG. 12 is a schematic structural diagram of a chip according to another exemplary embodiment.

FIG. 12 is a schematic structural diagram of another exemplary chip 1200 consistent with embodiments of the disclosure. The chip 1200 is configured to perform a method consistent with the disclosure, such as the exemplary method 300 described above in connection with FIG. 3. As shown in FIG. 12, the chip 1200 includes a storage medium 1210 storing a computer program and a processor 1220 configured to execute the computer program to perform a method consistent with the disclosure, such as the exemplary method 300 described above in connection with FIG. 3.

In some embodiments, the processor 1220 executes the computer program to obtain the merged attribute information of the image sensor and the pixel data inputted by the image sensor. The merged attribute information includes elements corresponding to pixels of the image sensor, respectively. An element of the merged attribute information that corresponds to at least one pixel of the image sensor includes the N types of attribute information of the at least one pixel, where N is an integer greater than or equal to 2. The processor 1220 further executes the computer program to process the pixel data inputted by the image sensor based on the merged attribute information.

According to the present disclosure, merged attribute information is used, in which an element corresponding to at least one pixel of the image sensor contains N types of attribute information of the at least one pixel. Thus, by using the merged attribute information, the image processing chip can complete the process of synchronizing the pixel data of the at least one pixel with the N types of attribute information of the at least one pixel at one time. As a result, the data processing efficiency is improved.

In some embodiments, the processor 1220 is further configured to obtain compressed data including the merged attribute information and decompress the compressed data to recover the merged attribute information.

In some embodiments, the compressed data is obtained through compression using run-length encoding. Correspondingly, the processor 1220 decompresses the compressed data using run-length decoding to recover the merged attribute information.

In some embodiments, the processor 1220 is further configured to decompress the compressed data using run-length decoding to obtain the original symbol sequence (which was encoded using run-length encoding to obtain the compressed data). One original symbol in the original symbol sequence includes K elements of the merged attribute information. K is an integer greater than one. The processor 1220 splits the K elements included in the original symbols of the original symbol sequence to restore the merged attribute information.

In some embodiments, K is greater than or equal to the number of pixels corresponding to the pixel data inputted to the chip 1200 by the image sensor in a clock cycle.

In some embodiments, the processor 1220 is further configured to obtain pixel data of M pixel(s) inputted by the image sensor in a first clock cycle, obtain the element(s) of the merged attribute information that correspond to the M pixel(s) before or during the first clock cycle, and synchronize the elements) of the merged attribute information that correspond to the M pixel(s) with the pixel data of the M pixel(s), where M is an integer greater than or equal to one.

In some embodiments, the processor 1220 is further configured to determine the N types of attribute information of a first pixel among the M pixel(s) according to the element corresponding to the first pixel, and process the pixel data of the first pixel according to the N types of attribute information of the first pixel.

In some embodiments, the processor 1220 is further configured to obtain the N types of attribute information for the first pixel from N fields of the element corresponding to the first pixel. One of the N fields includes at least one bit, and the N fields are used to record the N types of attribute information of the first pixel, respectively.

In some embodiments, the processor 1220 is further configured to determine the N types of attribute information of the first pixel according to the value of a target field of the element corresponding to the first pixel. Different values of the target field correspond to different combinations of the N types of attribute information.

In some embodiments, the N types of attribute information of the first pixel includes first attribute information and second information. The first attribute information indicates whether the first pixel is a dead pixel, and the second attribute information indicates whether the first pixel is a phase-focus point. The processor 1220 is further configured to perform dead pixel processing on the pixel data of the first pixel when the first attribute information of the first pixel indicates that the first pixel is a dead pixel and the second attribute information indicates that the first pixel is a phase-focus point. In some embodiments, the processor 1220 only performs the dead pixel processing on the pixel data of the first pixel, e.g., without performing another processing on the pixel data of the first pixel.

In some embodiments, the merged attribute information includes tabular information or array information.

In some embodiments, an element of the merged attribute information indicates the N types of attribute information of the pixel corresponding to the element.

In some embodiments, the N types of attribute information of a pixel includes first attribute information and second information. The first attribute information indicates whether the pixel is a dead pixel, and the second attribute information indicates whether the pixel is a phase-focus point.

Figure 13:
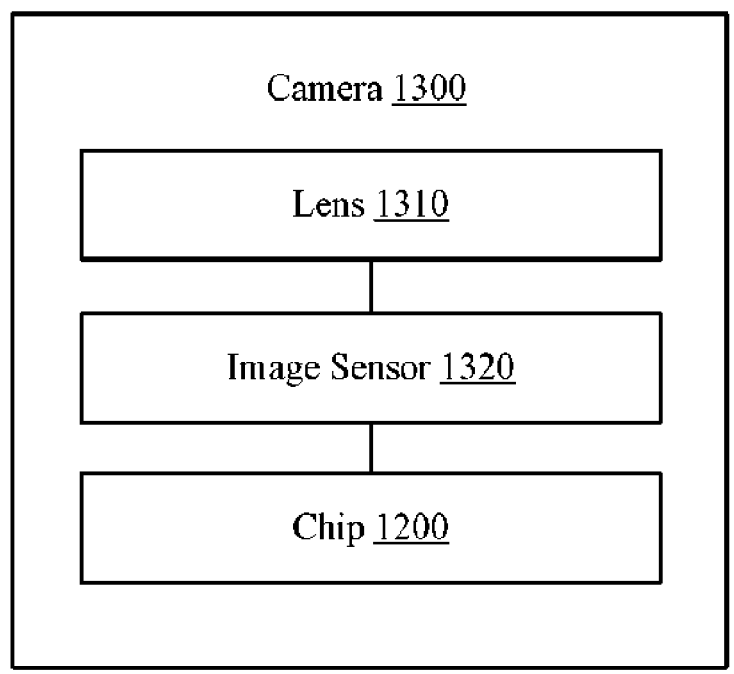
FIG. 13 is a schematic structural diagram of a camera according to another exemplary embodiment.

FIG. 13 is a schematic structural diagram of an exemplary camera 1300 consistent with embodiments of the disclosure. As shown in FIG. 13, the camera 1300 includes a lens 1310, an image sensor 1320, and the chip 1200.

In some embodiments, the camera 1300 can further include the chip 1100.

In some embodiments, the camera 1300 can further include a memory configured to store merged attribute information of the image sensor 1320. Further, the memory and the chip 1200 can be coupled to each other through a bus.

In some embodiments, the chip 1200 can be a DSP chip of the camera 1300, and the chip 1100 can be a master chip of the camera 1300.

Those of ordinary skill in the art will appreciate that the exemplary elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of exemplary systems, devices, and units may be omitted and references can be made to the descriptions of the exemplary methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A data processing method comprising:
obtaining merged attribute information of each pixel of an image sensor before the image sensor acquires image pixel data, the merged attribute information including sensor attribute elements each corresponding to at least one pixel of the image sensor and containing N fields corresponding to N types of attribute information of the at least one pixel, N being an integer larger than or equal to 2;
obtaining the image pixel data of the image sensor; and
processing the image pixel data according to the merged image sensor attribute information.

2. The method of claim 1, wherein the obtaining the merged attribute information includes:
obtaining compressed data including the merged attribute information, the compressed data being created using run-length encoding; and
decompressing the compressed data using run-length decoding to recover the merged attribute information.

3. The method of claim 2, wherein the decompressing the compressed data using run-length decoding to recover the merged attribute information includes:
decompressing the compressed data using run-length decoding to obtain an original symbol sequence including original symbols that each includes K of the sensor attribute elements of the merged attribute information, K being an integer larger than 1; and
splitting the K of the sensor attribute elements included in each of the original symbols to recover the merged attribute information.

4. The method of claim 1, wherein
the obtaining the image pixel data includes obtaining the image pixel data of one or more pixels within a clock cycle,
the obtaining the merged attribute information includes obtaining one or more of the sensor attribute elements of the merged attribute information that correspond to the one or more pixels before or within the clock cycle, and
the processing the image pixel data according to the merged attribute information includes synchronizing the one or more of the sensor attribute elements corresponding to the one or more pixels with the pixel data of the one or more pixels.

5. The method of claim 4, wherein the synchronizing the one or more of the sensor attribute elements corresponding to the one or more pixels with the pixel data of the one or more pixels includes:
determining the N types of attribute information of one of the one or more pixels according to an element of the merged attribute information that corresponds to the one of the one or more pixels; and
processing the image pixel data of the one of the one or more pixels according to the N types of attribute information of the one of the one or more pixels.

6. The method of claim 5, wherein:
the N types of attribute information of the one of the one or more pixels include:
first attribute information indicating whether the one of the one or more pixels is a dead pixel, and
second attribute information indicating whether the one of the one or more pixels is a phase-focus point, and
processing the image pixel data of the one of the one or more pixels according to the N types of attribute information of the one of the one or more pixels includes:
performing dead pixel processing on the image pixel data of the one of the one or more pixels in response to the first attribute information indicating that the one of the one or more pixels is a dead pixel and the second attribute information indicating that the one of the one or more pixels is a phase-focus point.

7. A data processing method comprising:
obtaining N types of attribute information of each pixel of an image sensor, N being an integer larger than or equal to 2; and
generating merged attribute information of the image sensor according to the N types of attribute information before the image sensor acquires image pixel data, the merged attribute information including sensor attribute elements each corresponding to at least one pixel of the image sensor and containing N fields corresponding to the N types of attribute information of the at least one pixel;
obtaining the image pixel data of the image sensor; and
processing the image pixel data according to the merged attribute information.

8. The method of claim 7, further comprising:
compressing the merged attribute information using run-length encoding to obtain compressed data.

9. The method of claim 8, wherein the compressing the merged attribute information using run-length encoding to obtain the compressed data includes:
grouping the merged attribute information to obtain an original symbol sequence, the original symbol including original symbols that each includes K of the sensor attribute elements of the merged attribute information, K being an integer larger than 1, and
performing run-length encoding on the original symbol sequence to obtain the compressed data.

10. The method of claim 7, wherein the generating the merged attribute information of the image sensor according to the N types of attribute information includes:
determining values for the N fields in the merged attribute information that correspond to one of the pixels of the image sensor according to the N types of attribute information of the one of the pixels, each of the N fields including at least one bit recording one of the N types of attribute information of the one of the pixels.

11. The method of claim 7, wherein the generating the merged attribute information of the image sensor according to the N types of attribute information includes:
determining a value for a target field in the merged attribute information that corresponds to one of the pixels of the image sensor according to the N types of attribute information of the one of the pixels, the value of the target field corresponding to a combination of the N types of attribute information of the one of the pixels.

12. The method of claim 7, wherein the N types of attribute information of a pixel include:
- first attribute information indicating whether the pixel is a dead pixel, and
- second attribute information indicating whether the pixel is a phase-focus point.

13. A chip comprising:
- a memory storing a computer program; and
- a processor configured to execute the computer program to:
  - obtain merged attribute information of each pixel of an image sensor before the image sensor acquires image pixel data, the merged attribute information including sensor attribute elements each corresponding to at least one pixel of the image sensor and containing N fields corresponding to N types of attribute information of the at least one pixel, N being an integer larger than or equal to 2;
  - obtain the image pixel data of the image sensor; and
  - process the image pixel data according to the merged attribute information.

14. The chip of claim 13, wherein the processor is further configured to execute the computer program to:
- obtain compressed data including the merged attribute information, the compressed data being created using run-length encoding; and
- decompress the compressed data using run-length decoding to recover the merged attribute information.

15. The chip of claim 14, wherein the processor is further configured to execute the computer program to:
- decompress the compressed data using run-length decoding to obtain an original symbol sequence including original symbols that each includes K of the sensor attribute elements of the merged attribute information, K being an integer larger than 1; and
- split the K of the sensor attribute elements included in each of the original symbols to recover the merged attribute information.

16. The chip of claim 13, wherein the processor is further configured to execute the computer program to:
- obtain the image pixel data of one or more pixels within a clock cycle;
- obtain one or more of the sensor attribute elements of the merged attribute information that correspond to the one or more pixels before or within the clock cycle; and
- synchronize the one or more of the sensor attribute elements corresponding to the one or more pixels with the image pixel data of the one or more pixels.

17. The chip of claim 16, wherein the processor is further configured to execute the computer program to:
- determine the N types of attribute information of one of the one or more pixels according to an element of the merged attribute information that corresponds to the one of the one or more pixels; and
- process the image pixel data of the one of the one or more pixels according to the N types of attribute information of the one of the one or more pixels.

18. The chip of claim 17, wherein the processor is further configured to execute the computer program to:
- obtain the N types of attribute information of the one of the one or more pixels from the N fields of an element corresponding to the one of the one or more pixels, each of the N fields including at least one bit recording one of the N types of attribute information of the one of the one or more pixels.

19. The chip of claim 17, wherein the processor is further configured to execute the computer program to:
- determine the N types of attribute information of the one of the one or more pixels based on a value of a target field in an element corresponding to the one of the one or more pixels, the value of the target field corresponding to a combination of the N types of attribute information of the one of the pixels.

20. The chip of claim 17, wherein:
- the N types of attribute information of the one of the one or more pixels include:
  - first attribute information indicating whether the one of the one or more pixels is a dead pixel, and
  - second attribute information indicating whether the one of the one or more pixels is a phase-focus point, and
- the processor is further configured to execute the computer program to:
  - perform dead pixel processing on the image pixel data of the one of the one or more pixels in response to the first attribute information indicating that the one of the one or more pixels is a dead pixel and the second attribute information indicating that the one of the one or more pixels is a phase-focus point.

21. A chip comprising:
- a memory storing a computer program; and
- a processor configured to execute the computer program to:
  - obtain N types of attribute information of each pixel of an image sensor, N being an integer larger than or equal to 2; and
  - generate merged attribute information of the image sensor, before the image sensor acquires image pixel data, according to the N types of attribute information, the merged attribute information including sensor attribute elements each corresponding to at least one pixel of the image sensor and containing N fields corresponding the N types of attribute information of the at least one pixel, N being an integer larger than or equal to 2;
  - obtain the image pixel data of the image sensor; and
  - process the image pixel data according to the merged attribute information.

22. The chip of claim 21, wherein the processor is further configured to execute the computer program to:
- compress the merged attribute information using run-length encoding to obtain compressed data.

23. The chip of claim 22, wherein the processor is further configured to execute the computer program to:
- group the merged attribute information to obtain an original symbol sequence, the original symbol including original symbols that each includes K sensor attribute elements of the merged attribute information, K being an integer larger than 1, and
- perform run-length encoding on the original symbol sequence to obtain the compressed data.

24. The chip of claim 21, wherein the processor is further configured to execute the computer program to:
- determine values for the N fields in the merged attribute information that correspond to one of the pixels of the image sensor according to the N types of attribute information of the one of the pixels, each of the N fields including at least one bit recording one of the N types of attribute information of the one of the pixels.

25. The chip of claim 21, wherein the processor is further configured to execute the computer program to:
- determine a value for a target field in the merged attribute information that corresponds to one of the pixels of the image sensor according to the N types of attribute information of the one of the pixels, the value of the target field corresponding to a combination of the N types of attribute information of the one of the pixels.

26. The chip of claim 21, wherein the N types of attribute information of a pixel include:
   first attribute information indicating whether the pixel is a dead pixel, and
   second attribute information indicating whether the pixel is a phase-focus point.

\* \* \* \* \*